(12) United States Patent
Wong

(10) Patent No.: US 11,459,105 B2
(45) Date of Patent: Oct. 4, 2022

(54) RECONFIGURABLE AVIONICS SYSTEMS HEATMAP

(71) Applicant: Rockwell Collins, Inc., Cedar Rapids, IA (US)

(72) Inventor: Jason L. Wong, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 300 days.

(21) Appl. No.: 16/809,119

(22) Filed: Mar. 4, 2020

(65) Prior Publication Data

US 2021/0347482 A1 Nov. 11, 2021

(51) Int. Cl.
*B64D 11/00* (2006.01)
*G07C 5/08* (2006.01)

(52) U.S. Cl.
CPC ........ *B64D 11/0015* (2013.01); *G07C 5/0825* (2013.01)

(58) Field of Classification Search
CPC ..... B64D 11/0015; G06F 3/14; G07C 5/0825; G09G 2340/04; G09G 2380/12; G09G 5/14; G09G 5/36; G09G 5/373
See application file for complete search history.

(56) References Cited

U.S. PATENT DOCUMENTS

| | | | |
|---|---|---|---|
| 5,668,542 A | 9/1997 | Wright | |
| 6,255,964 B1* | 7/2001 | Steele, Jr. | ............ G01C 23/00 340/975 |
| 6,636,786 B2 | 10/2003 | Partel | |
| 8,432,400 B1 | 4/2013 | Weskamp | |
| 9,309,009 B1 | 4/2016 | Poux et al. | |
| 10,042,456 B2 | 8/2018 | Kneuper et al. | |
| 2009/0048959 A1 | 2/2009 | Omura et al. | |
| 2014/0053101 A1* | 2/2014 | Buehler | .................. G09G 5/14 715/802 |
| 2015/0095102 A1 | 4/2015 | Hanley et al. | |
| 2016/0048788 A1 | 2/2016 | Martin et al. | |
| 2017/0337030 A1 | 11/2017 | Bolton | |
| 2019/0144129 A1 | 5/2019 | Ouellette | |
| 2019/0265066 A1 | 8/2019 | Kershaw et al. | |
| 2019/0384490 A1 | 12/2019 | Morowsky et al. | |

FOREIGN PATENT DOCUMENTS

WO 2011017063 A3 3/2011

OTHER PUBLICATIONS

Extended Search Report for European Application No. 21160780.9 dated Jun. 2, 2021, 10 pages.

* cited by examiner

*Primary Examiner* — Sisay Yacob
(74) *Attorney, Agent, or Firm* — Suiter Swantz pc llo

(57) ABSTRACT

A reconfigurable synoptic system utilizes commercial-off-the-shelf components to receive files indicating all of the connected avionics component and defining a weight of each component corresponding to the criticality of the component. The system divides the available display space into boxes that occupy space on the display based to the criticality of the corresponding component. Avionics components may be assemblages of sub-components, in which case the space designated for the component may be further divided according to its sub-components or the space designated for the component may be selectable to produce a similar display of only sub-components.

13 Claims, 7 Drawing Sheets

RECONFIGURABLE AVIONICS SYSTEMS HEATMAP

BACKGROUND

Synoptic and crew-alerting message systems are generally developed specifically for every new aircraft, especially where the systems include specific customer requirements. Newly developed synoptic systems must be certified to comply with various design assurance levels. Development and certification are expensive and time-consuming processes; developers must anticipate development costs when making a bid where no commercial-off-the-shelf components are used, and customers must wait the substantial development time without much indication of the final result.

SUMMARY

In one aspect, embodiments of the inventive concepts disclosed herein are directed to a reconfigurable synoptic system utilizing commercial-off-the-shelf components. The system receives files indicating all of the connected avionics component; the files also define a weight of each component corresponding to the criticality of the component. The system divides the available display space into boxes that occupy space on the display based to the criticality of the corresponding component.

In a further aspect, avionics components may be assemblages of sub-components. In that case, the space designated for the component may be further divided according to its sub-components. Alternatively, the space designated for the component may be selectable to produce a similar display of only sub-components.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
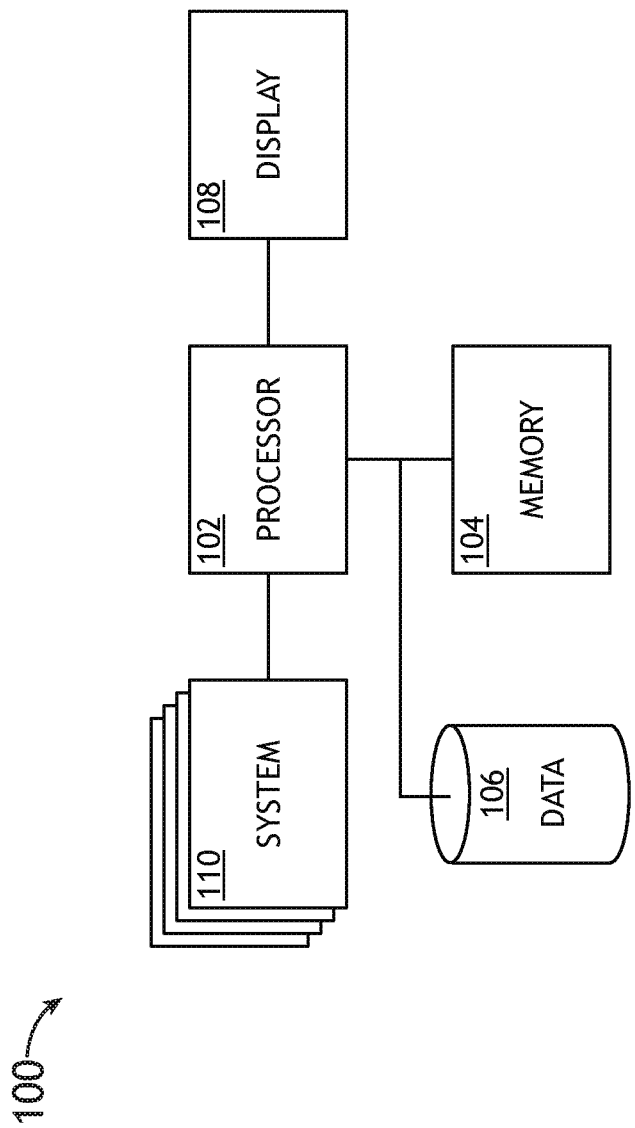
FIG. 1 shows a block diagram of a system for implementing an exemplary embodiment of a reconfigurable synoptic message element.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a reconfigurable synoptic system utilizing commercial-off-the-shelf components. The system receives files indicating all of the connected avionics component; the files also define a weight of each component corresponding to the criticality of the component. The system divides the available display space into boxes that occupy space on the display based to the criticality of the corresponding component.

Referring to FIG. 1, a block diagram of a system 100 for implementing an exemplary embodiment of a reconfigurable synoptic message element is shown. The system 100 includes a processor 102 configured via non-transitory processor executable code stored in a memory 104 to retrieve configuration data from a data storage element 106. The configuration data includes a set of avionics components and corresponding criticality values. The avionics components correspond to avionics systems 110 in data communication with the processor 102, and the criticality values correspond to a metric of absolute or relative importance of the corresponding avionics system 110.

In at least one embodiment, the avionics components may comprise composite avionics components and sub-components of those composite avionics components. The criticality value associated with the sub-components may define an absolute criticality, separate from the composite avionics component. Alternatively, the criticality value associated with the sub-components may define a relative criticality that only applies to the composite avionics component.

Figure 2:
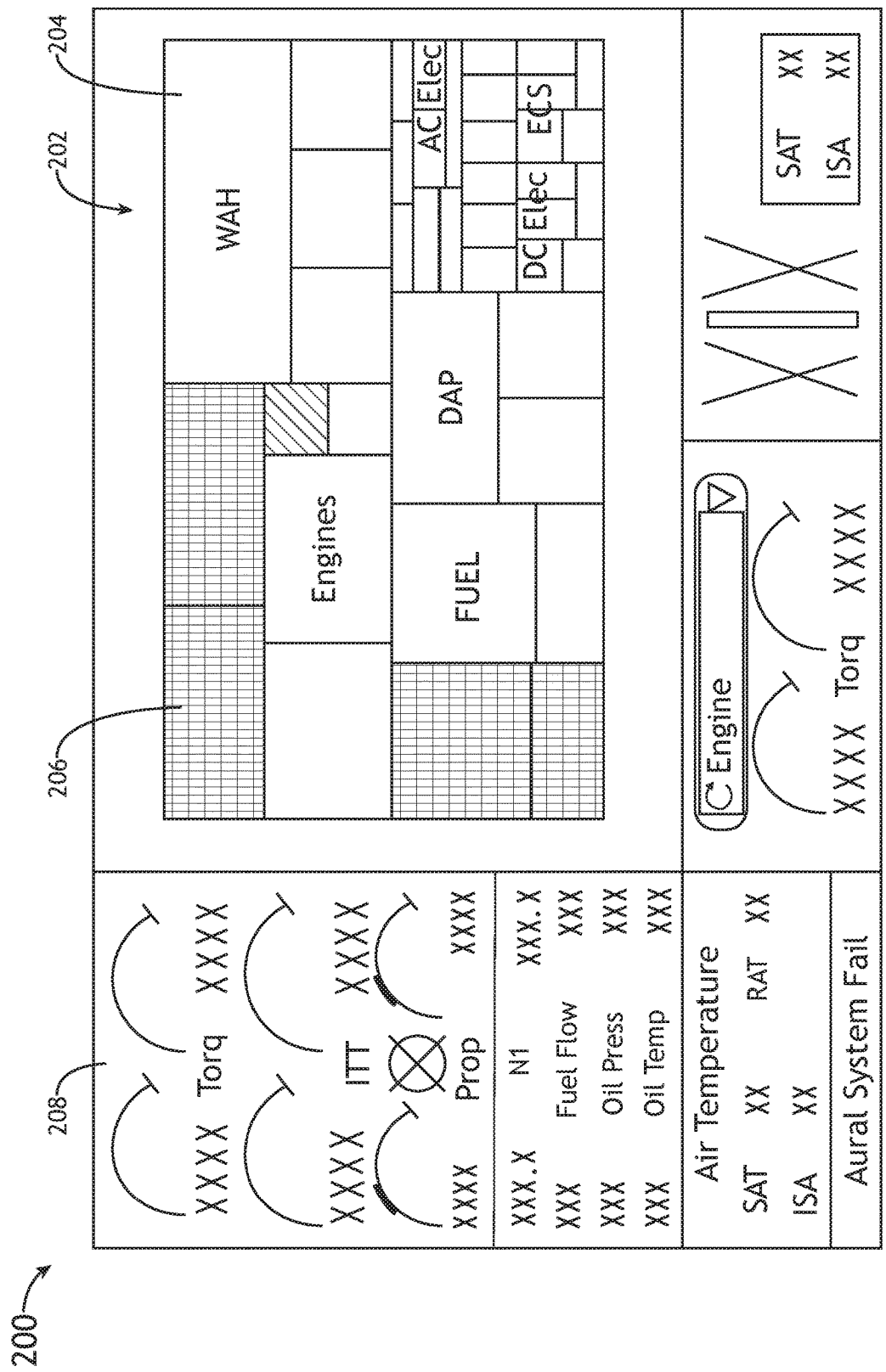
FIG. 2 shows an environmental view of a display including an exemplary embodiment of a reconfigurable synoptic message element.

Referring to FIG. 2, an environmental view of a display 200 including an exemplary embodiment of a reconfigurable synoptic message element 202 is shown. The synoptic message element 202 comprises a heat map divided into separate indicators 204, 206, each representing an avionics component, to represent hierarchical data. The separate indicators 204, 206 are sized relative to each other according to a criticality value associated with the corresponding avionics component. The synoptic message element 202 provides an overall indication of system health, visually weighted according to criticality of each avionics component. Indicators 204, 206 are color coded according to the status of the corresponding avionics component. For example, in FIG. 2, while the majority of systems are indicated within normal parameters (for example by green), engines and fuel systems are exhibiting major issues (for example by red or amber).

In at least one embodiment, the display 200 may also include display elements 208 such as fixed display elements that are permanently rendered. Alternatively, or in addition, the display elements 208 may render detailed data associated with a selected indicator 204, 206.

Figure 3A:
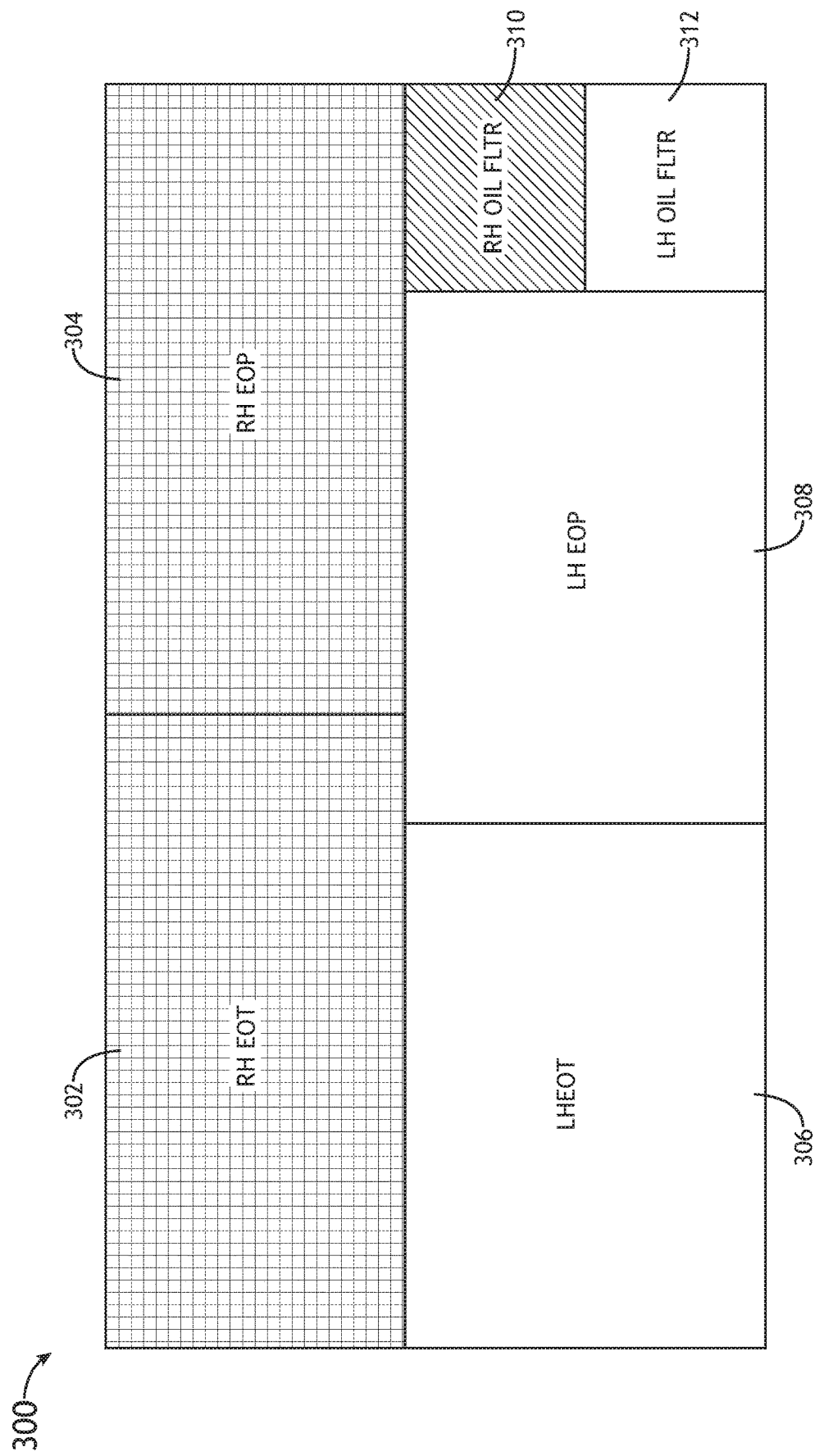
FIG. 3A shows a block representation of an exemplary embodiment.
Figure 3B:
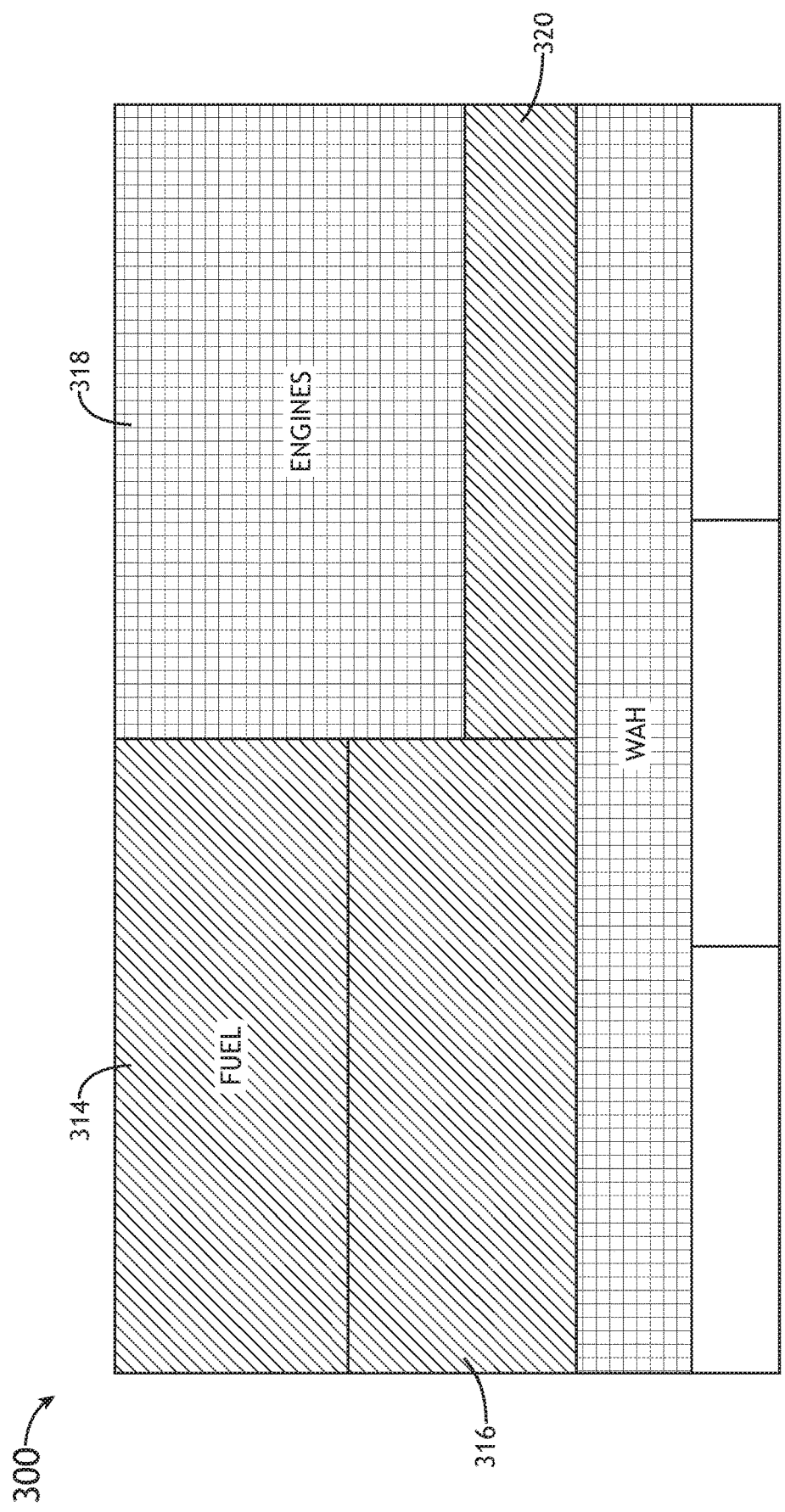
FIG. 3B shows a block representation of an exemplary embodiment.
Figure 3C:
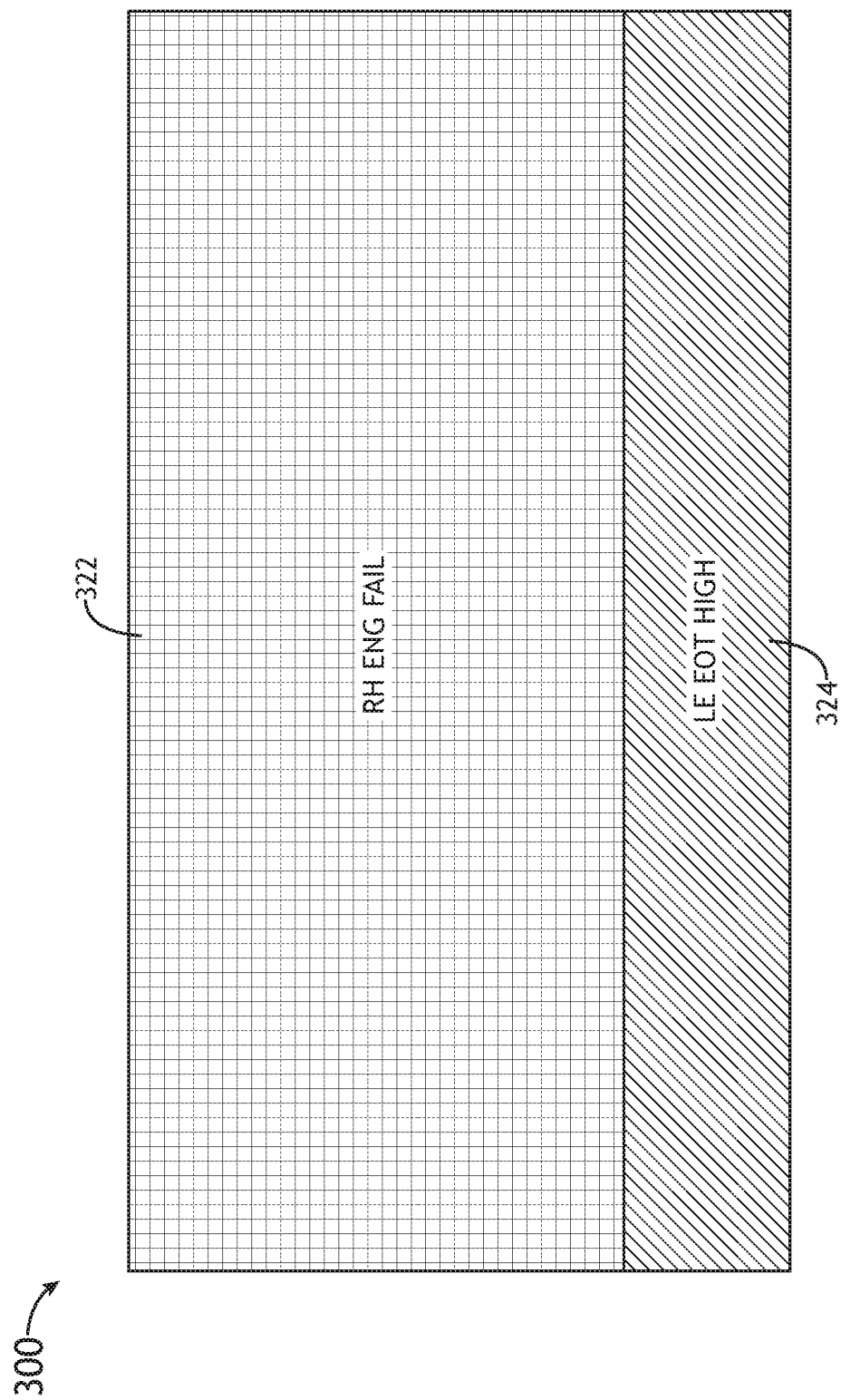
FIG. 3C shows a block representation of an exemplary embodiment.

Referring to FIGS. 3A-3C, block representations of exemplary embodiments are shown. A synoptic message element 300 may be dynamically defined according to a configuration file or data stream to produce a heat map of indicators 302, 304, 306, 308, 310, 312, 314, 316, 318, 320, 322, 324, each sized relative to each other according to an associated criticality value of the represented avionics component, and all of the indicators 302, 304, 306, 308, 310, 312, 314, 316, 318, 320, 322, 324 disposed and tiled to fill the usable space. The heat map provides a visual indication of the health of the entire system, weighted according to the criticality of the individual avionics components. For example, indicators 302, 304 corresponding to the right-hand engine are much larger than indicators 310, 312 corresponding to oil filters, so even though majority of systems may be indicated as normal, a failure of critical systems (such as an engine) produce an indication of an overall unhealthy system. It should be noted that indicators 302, 304, 306, 308, 310, 312, 314, 316, 318, 320, 322, 324 corresponding to the same criticality may have different shapes, but cover the same area.

In at least one embodiment, the configuration data may include textual data to overlay individual indicators 302, 304, 306, 308, 310, 312, 314, 316, 318, 320, 322, 324 or groups of indicators 302, 304, 306, 308, 310, 312, 314, 316, 318, 320, 322, 324. Furthermore, the configuration data may define groupings that are desirable to keep in proximity during a tiling process as more fully defined herein.

In at least one embodiment (such as in FIG. 3B), the synoptic message element 300 may be applied to a crew-alerting system. Furthermore, the synoptic message element 300 may provide a detailed view of more general indicators; for example, FIG. 3C shows a detailed view of indicators 318, 320 in FIG. 3B. Textual data may be applied to groupings (i.e. "Engines" in FIG. 3B) in a general view and to individual indicators 322, 324 (i.e. "RH ENG FAIL" and "LH EOT HIGH" in FIG. 3C) in a detailed view. In at least one embodiment, the detailed view may provide specific status information pertaining to a fault.

Figure 4:
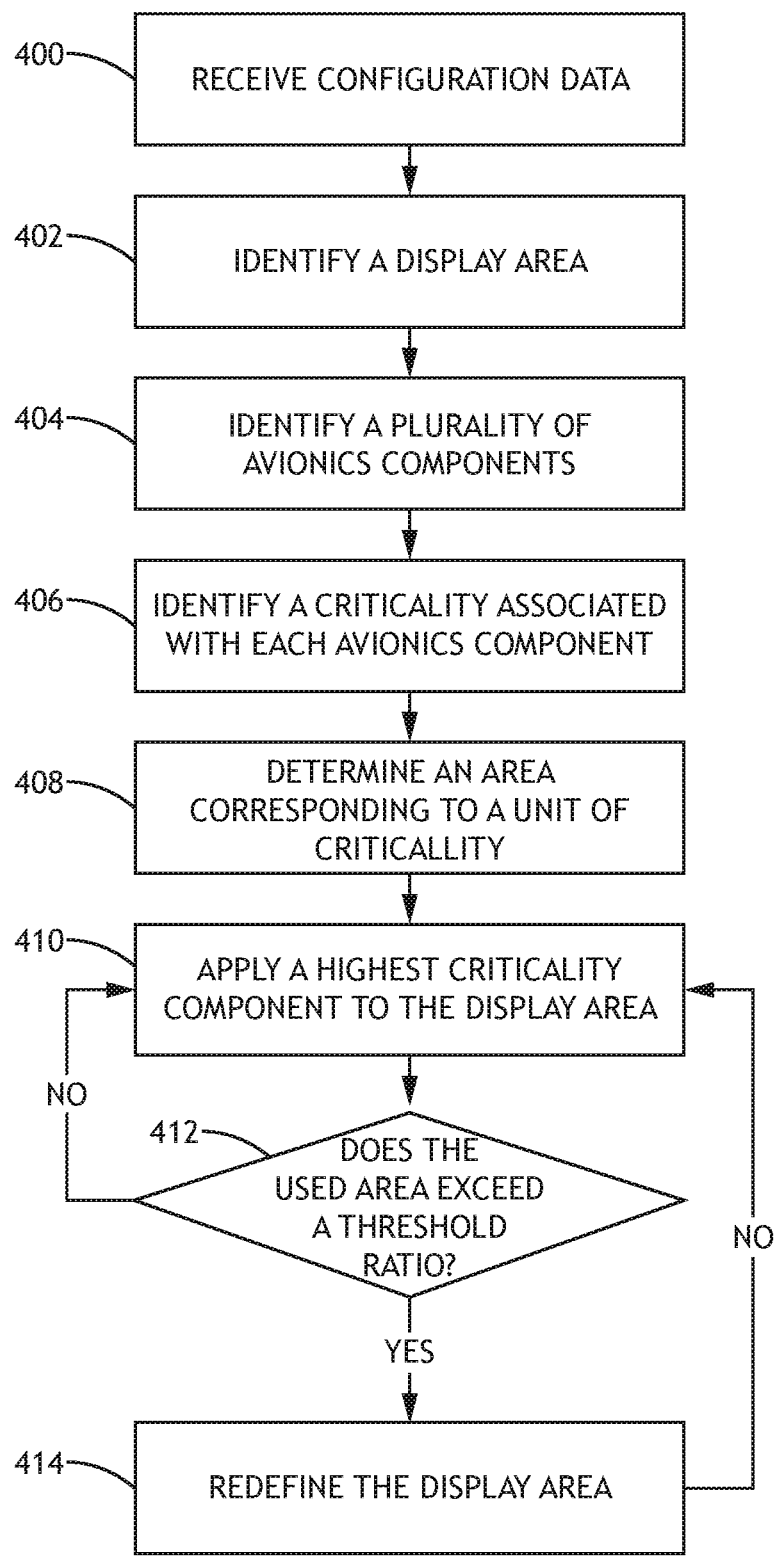
FIG. 4 shows a flowchart of a method for determining a layout of a reconfigurable synoptic message element according to an exemplary embodiment.

Referring to FIG. 4, a flowchart of a method for determining a layout of a reconfigurable synoptic message element according to an exemplary embodiment is shown. The system configuring the synoptic message element receives 400 configuration data, either form a stored data file or from one or more data streams, and the usable display area on a display device is determined 402. Based on the configuration data, a plurality of avionics components is identified 404; likewise, a corresponding criticality value for each avionics component is identified 406. In at least one embodiment, individual avionics components may be associated with each other in the configuration data such that when the usable area is tiled (as more fully described herein) those components are kept in relative proximity regardless of their corresponding criticality values.

In at least one embodiment, relative sizes of individual indicators are determined 408 with respect to each other and the total usable area such that after tiling, the total usable area will be completely utilized by individual indicators. For example, the total usable are may be divided by the total of all criticality values so that the area covered by each individual indicator will directly correspond to its relative criticality. It may be appreciated that while relative size comparisons are shown directly corresponding to criticality values, other relationships are envisioned; for example, fixed relative size with size assignment based on the criticality value, logarithmic size assignment, etc.

The system then begins iteratively applying 410 the next highest criticality individual indicator to the usable area according to a space filling algorithm. In at least one embodiment, the system may define a desirable display ratio; as the next highest criticality individual indicator is applied 410, the system determines 412 if a display ratio threshold has been exceeded. For example, it may be desirable stack individual indicators in a vertical column, where the width of the column expands as each individual indicator is applied and the defined area of each individual indicator requires its width to expand. At some point, the width of that column as compared to its height will exceed the display ratio threshold. When the display ratio threshold is exceeded, the usable area is redefined 414 to be the display are where individual indicators have not been applied 410. The system then continues applying 410 the next highest criticality unapplied indicators to the newly redefined 414 usable area until all the individual indicators are assigned a space in the usable area.

In at least one embodiment, the individual indicators may be organized in a data structure according to criticality and grouping such that closely related but lower criticality individual indicators are applied 410 near associated, higher criticality indicators. Alternatively, or in addition, groupings of individual indicators may define a composite individual indicator having an are corresponding to the total areas of the individual indicators in the grouping. Once the composite individual indicator is applied 410, the individual indicators in the corresponding grouping are applied 410 to the are defined by the composite individual indicator according to a similar process.

Figure 5:
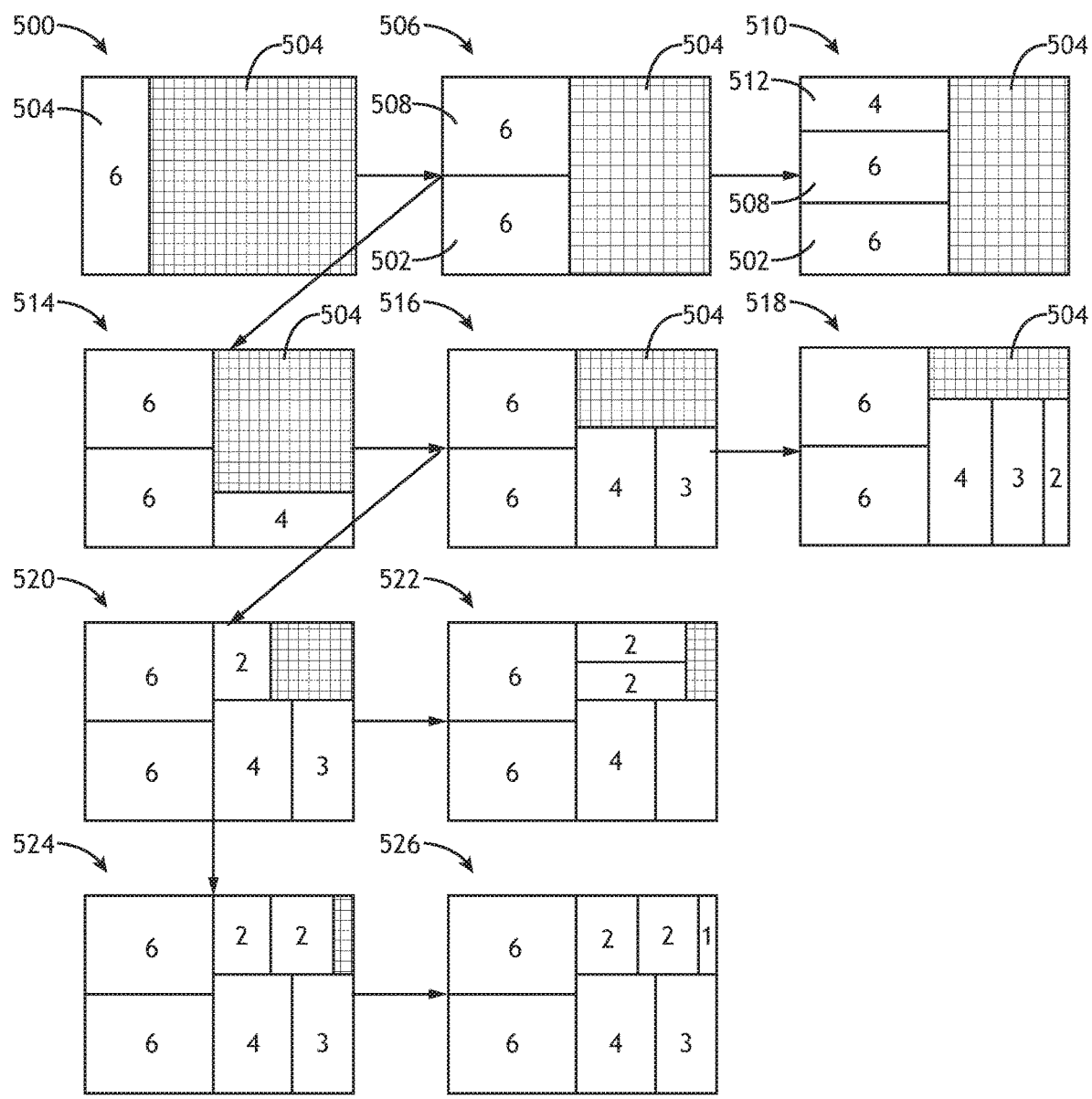
FIG. 5 shows a block representation of an exemplary embodiment of a process for determining a layout of reconfigurable synoptic message element.

Referring to FIG. 5, a block representation of an exemplary embodiment of a process for determining a layout of reconfigurable synoptic message element is shown. A system determining the layout defines a usable area and defines areas for a plurality of individual indicators 502, 508, 512 such that the total area of the individual indicators 502, 508, 512 is substantially equal to the usable area. The system then iteratively applies the individual indicators 502, 508, 512 from largest area to smallest area (highest criticality to lowest criticality) according to a tiling algorithm until all of the individual indicators 502, 508, 512 are applied.

In one exemplary embodiment, in a first step 500, a first individual indicator 502 is applied to cover a vertical column at the leftmost edge of the usable area, leaving an unapplied usable area 504. The shape of the first individual indicator 502, as defined by vertical aspect of the usable area, may define a display ratio or aspect ratio. The system may define a desirable display ratio (such as 1-to-1). In a second step 506, a second individual indicator 508 is applied in the same vertical column, changing the shape of the first individual indicator 502 such that both the first individual indicator 502 and second individual indicator 508 define the full vertical column. The system may compare display ratios of the applied individual indicators 502, 508 from the first step 500 to the second step 506 to determine if they are converging on or diverging from the desirable ratio. In this exemplary embodiment, the display ratio improves between the first step 500 and the second step 506 from 8-to-3 to 3-to-2. The system may proceed to a third step 510 where a third individual indicator 512 is applied to the vertical column. In this exemplary embodiment, the display ratio diverges with the addition of the third individual indicator 512 to 4-to-1. In this exemplary embodiment, the third step 510 is rolled back.

In a fourth step 514 the third individual indicator 512 is applied to fill a horizontal row the unapplied usable area 504. A similar process is iteratively applied in subsequent steps 516, 618, 520, 522, 524, 526 until the entire usable area is tiled with individual indicators 502, 508, 512 having display ratios approaching the desirable ratio (with the possible exception of a last individual indicator which may simply fill the remaining area, no matter the shape).

Embodiments of the present disclosure may be implemented via a table-driven interpretive software approach to read configurable data files and dynamically display synoptic and crew-alerting system data. The system may thereby be certified once, and reconfigured with data files such that recertification is unnecessary.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a display;
   a data storage element; and
   at least one processor in data communication with the display, the data storage element, and a memory storing processor executable code for configuring the at least one processor to:
   retrieve configuration data from the data storage element, the configuration data comprising a set of avionics components and a criticality value associated with each avionics component;
   determine a usable area of the display, the usable area dedicated to displaying a status summary of the set of avionics components;
   determine a desired display ratio; and
   tile the usable area with sub-areas while maintaining the display ratio, each sub-area corresponding to an avionics component, and defining a size corresponding to the criticality value.

2. The computer apparatus of claim 1, wherein tiling comprises:
   sorting the data according to the criticality values;
   iteratively applying a highest criticality, untiled avionics component until the display ratio is exceeded; and
   repeatedly tiling the remaining usable area.

3. The computer apparatus of claim 1, wherein the at least one processor is further configured to:
   determine that at least one composite avionics component comprises two or more sub-components; and
   after determining a tiling including the composite avionics component, tile a space allocated to the composite avionics component according to the sub-components.

4. The computer apparatus of claim 1, wherein the at least one processor is further configured to:
   determine that at least one composite avionics component comprises two or more sub-components;
   determine a sub-component tiling of the usable area for the sub-components; and
   store the sub-component tiling for rendering when a tile associated with the composite avionics component is selected.

5. The computer apparatus of claim 4, wherein the at least one processor is further configured to:
   identify a fault in a sub-component; and
   render the tile associated with the composite avionics component according to a highest alert status of any sub-components.

6. The computer apparatus of claim 4, wherein the at least one processor is further configured to:
   identify a fault in a sub-component; and
   render the tile associated with the composite avionics component according to a value determined by an alert status of each sub-components weighted by a criticality component of the corresponding sub-component.

7. A synoptic message system comprising:
   a display;
   a data storage element; and
   at least one processor in data communication with the display, the data storage element, and a memory storing processor executable code for configuring the at least one processor to:
   retrieve configuration data from the data storage element, the configuration data comprising a set of avionics components and a criticality value associated with each avionics component;

determine a usable area of the display, the usable area dedicated to displaying a status summary of the set of avionics components;

determine that at least one composite avionics component comprises two or more sub-components; and tile the usable area with sub-areas, each sub-area corresponding to an avionics component, and defining a size corresponding to the criticality value;

after determining a tiling including the composite avionics component, tile a space allocated to the composite avionics component according to the sub-components;

receive a real-time status from each avionics component via a datalink connection; and render a representation of each real-time status in a tile associated with the corresponding avionics component.

8. The synoptic message system of claim 7, wherein:

the at least one processor is further configured to determine a desired display ratio; and tiling the usable area comprises maintaining the display ratio.

9. The synoptic message system of claim 8, wherein tiling comprises:

sorting the data according to the criticality values;

iteratively applying a highest criticality, untiled avionics component until the display ratio is exceeded; and repeatedly tiling the remaining usable area.

10. The synoptic message system of claim 8, wherein the display ratio is defined to maintain approach substantially square tiles.

11. The synoptic message system of claim 7, wherein the at least one processor is further configured to:

store the sub-component tiling for rendering when a tile associated with the composite avionics component is selected.

12. The synoptic message system of claim 11, wherein the at least one processor is further configured to:

identify a fault in a sub-component; and render the tile associated with the composite avionics component according to a highest alert status of any sub-components.

13. The synoptic message system of claim 11, wherein the at least one processor is further configured to:

identify a fault in a sub-component; and render the tile associated with the composite avionics component according to a value determined by an alert status of each sub-components weighted by a criticality component of the corresponding sub-component.

* * * * *